US012791966B2

(12) United States Patent
Maeda et al.

(10) Patent No.: US 12,791,966 B2
(45) Date of Patent: Nov. 10, 2026

(54) METHOD OF CONTROLLING BIDIRECTIONAL THYRISTOR IN IMAGE FORMING APPARATUS

(71) Applicant: CANON KABUSHIKI KAISHA, Tokyo (JP)

(72) Inventors: Yasukazu Maeda, Kanagawa (JP); Nozomu Nakajima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 19/003,973

(22) Filed: Dec. 27, 2024

(65) Prior Publication Data

US 2026/0121550 A1 Apr. 30, 2026

(30) Foreign Application Priority Data

Jan. 4, 2024 (JP) ................................ 2024-000308

(51) Int. Cl.
*G03G 15/20* (2006.01)
*G03G 15/00* (2006.01)
*H05B 1/02* (2006.01)
*H05B 3/00* (2006.01)

(52) U.S. Cl.
CPC ..... *G03G 15/2039* (2013.01); *G03G 15/2064* (2013.01); *G03G 15/5004* (2013.01); *G03G 15/80* (2013.01); *H05B 1/0241* (2013.01); *H05B 3/0019* (2013.01)

(58) Field of Classification Search
CPC ........... G03G 15/2039; G03G 15/2064; G03G 15/205; G03G 15/5004; G03G 15/80; G03G 2215/00978; H02M 7/1555; H05B 1/0241; H05B 3/0019; H05B 3/0066; H05B 39/047; H05B 39/09; H05B 47/105
USPC .......... 399/33, 328, 330; 219/216, 244, 388, 219/482, 488
See application file for complete search history.

(56) References Cited

U.S. PATENT DOCUMENTS

2020/0150573 A1* 5/2020 Izaki .................. G03G 15/5004
2021/0364953 A1* 11/2021 Nagashima ........ G03G 15/5004
2022/0082966 A1* 3/2022 Oi ...................... G03G 15/2017
2023/0273561 A1* 8/2023 Nagashima ........ G03G 15/5004 399/69

FOREIGN PATENT DOCUMENTS

JP 2022047905 A 3/2022

* cited by examiner

*Primary Examiner* — Robert B Beatty
(74) *Attorney, Agent, or Firm* — Canon U.S.A., Inc. IP Division

(57) ABSTRACT

A heating member applies heat to a toner image formed on a sheet and fixes the toner image to the sheet. A bidirectional thyristor controls whether to supply power from an alternating current (AC) power source to the heating member. A direct current (DC) voltage source supplies a control signal to a gate terminal of the bidirectional thyristor. An obtaining circuit obtains a state parameter including at least one among a temperature of the bidirectional thyristor, an AC voltage supplied from the AC power source, and an operational history of the DC voltage source. A controller controls the number of outputs of the control signal outputted from the DC voltage source to the gate terminal in a half cycle of the AC voltage according to the state parameter.

18 Claims, 11 Drawing Sheets

400

| ESTIMATED Tj VALUE | NUMBER N OF OUTPUTS OF FSRD SIGNAL PER ONE HALF WAVE |
|---|---|
| 25°C OR MORE | 3 TIMES |
| LESS THAN 25°C | 2 TIMES |

AC VOLTAGE

FSRD SIGNAL

AC CURRENT

VOLTAGE ACROSS

800

| | ESTIMATED Tj VALUE | CUMULATIVE ENERGIZATION TIME | NUMBER N OF OUTPUTS |
|---|---|---|---|
| PATTERN P1 | 25°C OR MORE | LESS THAN 800 h | 5 TIMES |
| PATTERN P2 | 25°C OR MORE | 800 h OR MORE | 4 TIMES |
| PATTERN P3 | LESS THAN 25°C | LESS THAN 800 h | 3 TIMES |
| PATTERN P4 | LESS THAN 25°C | 800 h OR MORE | 2 TIMES |

FIG. 11

1100

| | ESTIMATED Tj VALUE | AC VOLTAGE Vac | NUMBER N OF OUTPUTS |
|---|---|---|---|
| PATTERN P5 | 25°C OR MORE | 100 V OR MORE | 5 TIMES |
| PATTERN P6 | 25°C OR MORE | LESS THAN 100 V | 4 TIMES |
| PATTERN P7 | LESS THAN 25°C | 100 V OR MORE | 3 TIMES |
| PATTERN P8 | LESS THAN 25°C | LESS THAN 100 V | 2 TIMES |

METHOD OF CONTROLLING BIDIRECTIONAL THYRISTOR IN IMAGE FORMING APPARATUS

BACKGROUND

Field

The present disclosure relates to a method of controlling a bidirectional thyristor in an image forming apparatus.

Description of the Related Art

Electrophotographic fixing devices fix a toner image onto a sheet by melting the toner by heat of a heater that generates heat by being supplied with alternating current (AC). Japanese Patent Laid-Open No. 2022-047905 describes controlling the supply of alternating current to a heater using a bidirectional thyristor (TRIAC).

According to Japanese Patent Laid-Open No. 2022-047905, trigger current (gate trigger current), which is supplied to a gate terminal to turn on a bidirectional thyristor, is generated by discharge of a capacitor. This capacitor is charged in the first half cycle (half wave) of the alternating current and generates the gate trigger current in the next half cycle. Further, Japanese Patent Laid-Open No. 2022-047905 proposes outputting the gate trigger current a plurality of times during a half cycle as a measure against waveform distortion of the alternating current supplied from an AC power source.

When the gate trigger current is outputted a plurality of times during a half cycle, the voltage across the capacitor gradually decreases during that half cycle. When the voltage across the capacitor decreases, the gate trigger current decreases, and the bidirectional thyristor eventually stops conducting. The gate trigger current used to turn on the bidirectional thyristor increases as the temperature (Tj) of the junctions of the bidirectional thyristor decreases. Further, the capacitance of the capacitor decreases due to aging. Therefore, the gate trigger current that the capacitor can generate also decreases. Further, when the voltage across the capacitor decreases due to fluctuations in AC voltage, the gate trigger current also decreases.

SUMMARY

The present disclosure provides exemplary embodiments of an image forming apparatus including a heating member configured to apply heat to a toner image formed on a sheet and fix the toner image to the sheet; a bidirectional thyristor configured to control whether to supply power from an alternating current (AC) power source to the heating member; a direct current (DC) voltage source configured to supply a control signal to a gate terminal of the bidirectional thyristor; an obtaining circuit configured to obtain a state parameter including at least one among a temperature of the bidirectional thyristor, an AC voltage supplied from the AC power source, and an operational history of the DC voltage source; and a controller configured to control the number of outputs of the control signal outputted from the DC voltage source to the gate terminal in a half cycle of the AC voltage according to the state parameter.

Further features of the present disclosure will become apparent from the following description of exemplary embodiments (with reference to the attached drawings).

BRIEF DESCRIPTION OF THE DRAWINGS

FIG. 11 is a diagram illustrating a table holding a correspondence relationship between temperature and the number of outputs.

DESCRIPTION OF THE EMBODIMENTS

Figure 1:
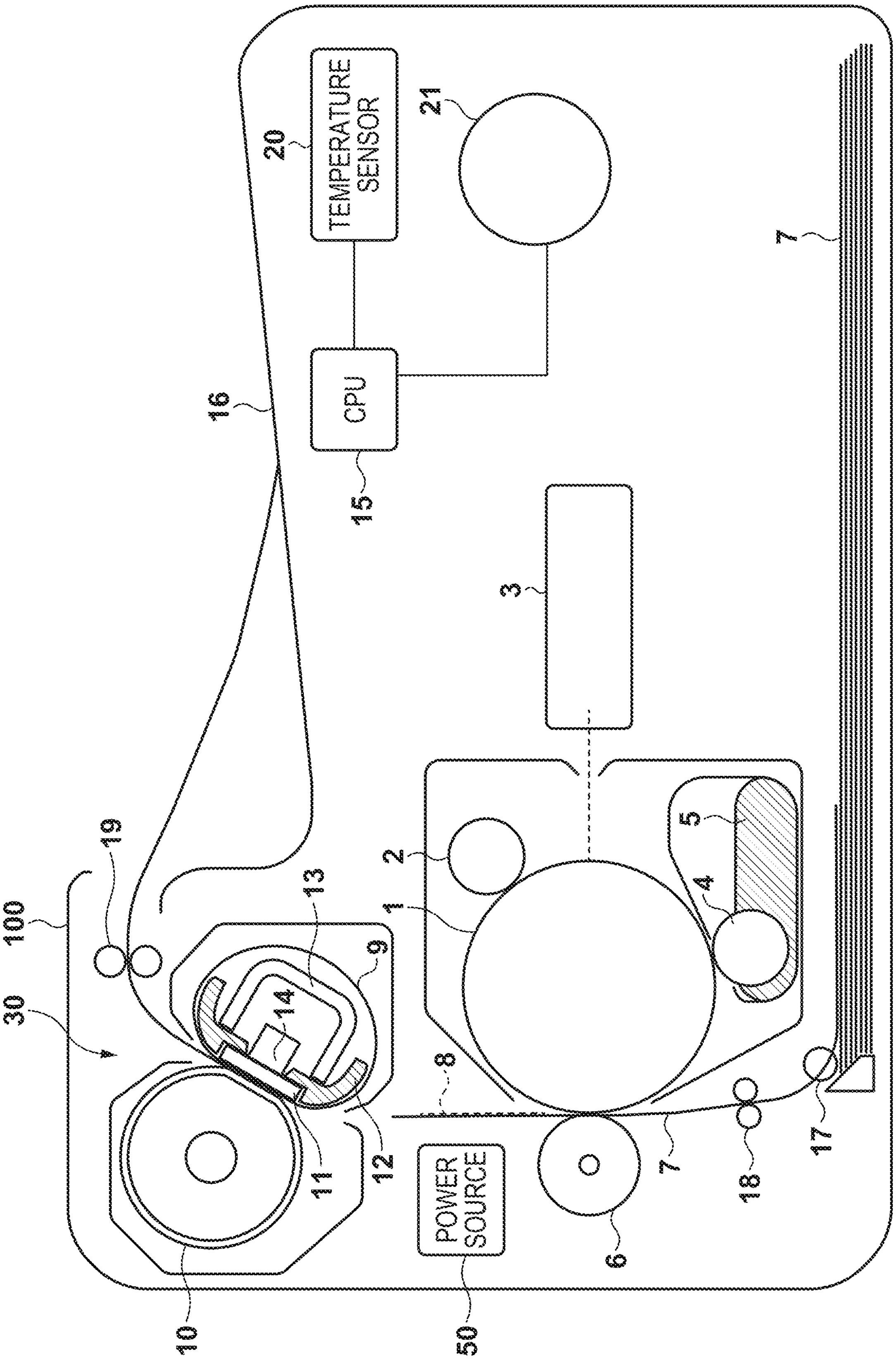
FIG. 1 is a diagram illustrating an image forming apparatus.

Hereinafter, various exemplary embodiments, features, and aspects of the present disclosure will be described in detail with reference to the attached drawings. Note, the following embodiments are not intended to limit the scope of the claimed invention. Multiple features are described in the embodiments, but limitation is not made to an embodiment that uses all such features, and multiple such features may be combined as appropriate. Furthermore, in the attached drawings, the same reference numerals are given to the same or similar configurations, and redundant description thereof is omitted.

First Embodiment

1. Image Forming Apparatus

As illustrated in FIG. 1, an image forming apparatus 100 is an electrophotographic laser beam printer. A photosensitive drum 1 is a photosensitive body on which a photosensitive layer is formed on the surface and is an image carrier. A charging roller 2 charges the surface layer of the photosensitive drum 1. A laser scanner 3 is an exposure apparatus or an optical scanning apparatus that irradiates the surface layer of the photosensitive drum with a laser beam corresponding to an image signal to form an electrostatic latent image. A developing roller 4 develops the electrostatic latent image using toner 5 stored in a toner container to form a toner image. A transfer roller 6 is a roller that supplies transfer charge to a sheet 7. The transfer roller 6 transfers the toner image from the photosensitive drum 1 to the sheet 7 passing through a transfer nip portion formed by the photosensitive drum 1 and the transfer roller 6. Then, the sheet 7 is conveyed to a fixing device 30.

The fixing device 30 includes a tubular fixing film 9 and a heater 11 arranged in the internal space of the fixing film 9. The heater 11 generates heat by electric power supplied from a power source 50. The power source 50 supplies alternating current supplied from an AC power source to the heater 11. A pressing roller 10 contacts the outer peripheral surface of the fixing film 9 and presses against the fixing film 9 to form a fixing nip portion. The sheet 7 and the toner image 8 are subjected to heat from the heater 11 through the fixing film 9. In addition, the sheet 7 and the toner image 8 are pressed at the fixing nip portion. The heater 11 is, for example, a heater that includes a ceramic substrate, a heating layer, and a protective layer. A stay 12 is a holding member that holds the heater 11. A reinforcing member 13 is a member that reinforces and supports the stay 12.

A thermistor 14 is a temperature sensor that senses the temperature of the heater 11. The sensing result of the thermistor 14 is used for feedback control for maintaining the temperature of the heater 11 at a target temperature. Then, the sheet 7 is discharged from the fixing nip portion to a discharge tray 16 of the image forming apparatus 100 through a discharge port.

A feed roller 17 is a roller that feeds the sheet 7. Conveyance rollers 18 and 19 are rollers that convey the sheet 7 along a conveyance path. A CPU 15 is a processor or a controller that controls various operations of the image forming apparatus 100. CPU is an abbreviation of central processing unit. The CPU 15 may include one or more processors, a memory 22, a timer 23, and may have other components. The memory 22 includes a non-volatile storage region (ROM region) and a volatile storage region (RAM region). ROM is an abbreviation of read-only memory. RAM is an abbreviation of random access memory. The timer 23 may be realized by a real-time clock (RTC) or a counter circuit. A temperature sensor 20 is connected to the CPU 15 and senses the temperature inside the image forming apparatus 100. A motor 21 rotates the photosensitive drum 1, the developing roller 4, the transfer roller 6, the pressing roller 10, the feed roller 17, and the like at predetermined speeds based on instructions from the CPU 15.

2. Heater Power Source 2-1. Circuit Configuration

Figure 2:
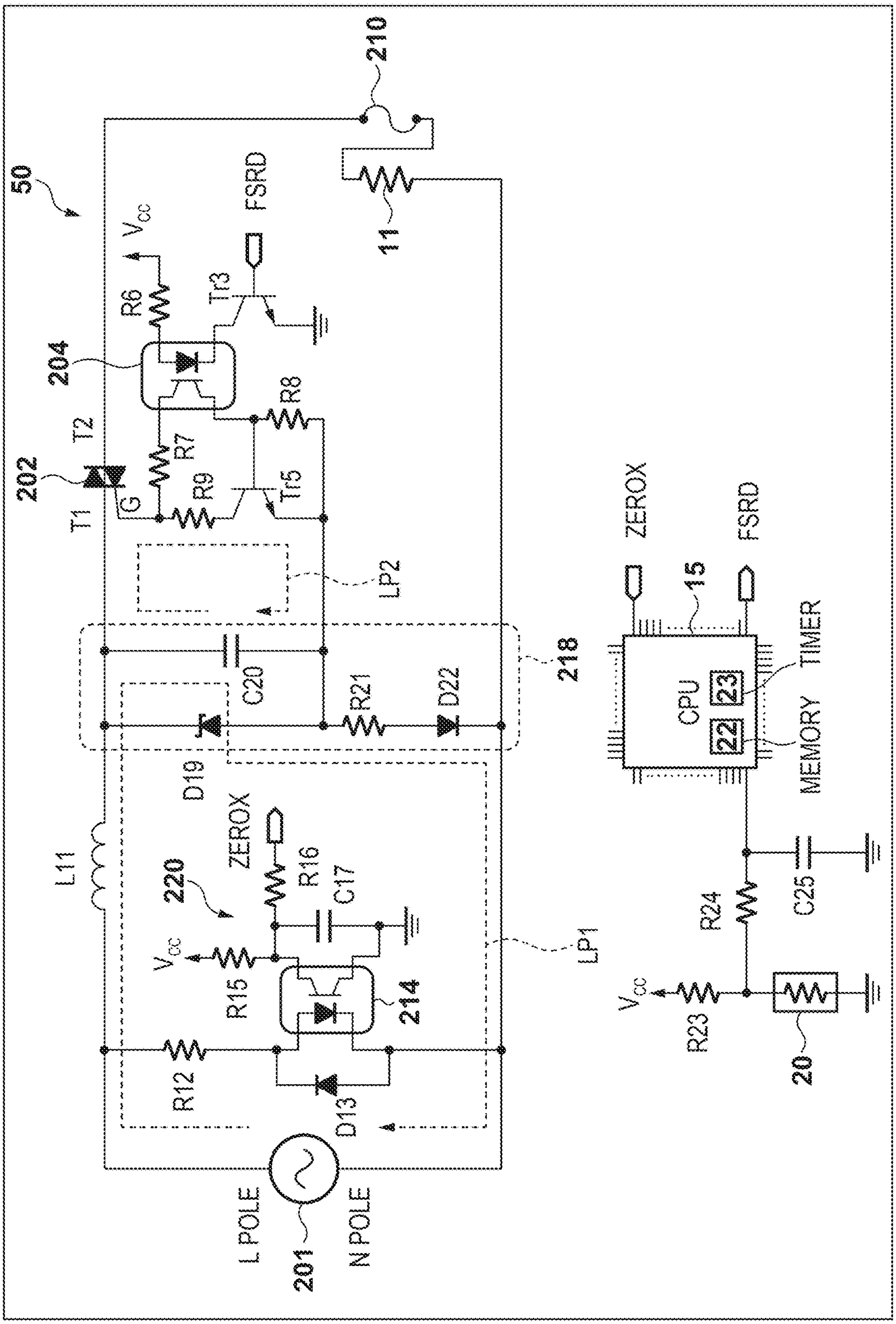
FIG. 2 is a circuit diagram illustrating a power source.

FIG. 2 is a circuit diagram of the power source 50, which operates as a heater power source. A bidirectional thyristor 202 is a control element that controls power supply from an AC power source 201 to the heater 11. A driving circuit that drives the bidirectional thyristor 202 includes, for example, transistors Tr3 and Tr5, a photocoupler 204, and resistors R6, R7, R8, and R9. The base of the transistor Tr3 is connected to an output port of the CPU 15. The emitter of the transistor Tr3 is grounded. The collector of the transistor Tr3 is connected to the cathode of a light emitting diode (LED) in the photocoupler 204. The anode of the light emitting diode in the photocoupler 204 is connected to a reference power source Vcc through the resistor R6. The collector of a phototransistor in the photocoupler 204 is connected to one end of the resistor R7. The emitter of the phototransistor in the photocoupler 204 is connected to one end of the resistor R8 and the base of the transistor Tr5. The other end of the resistor R7, and one end of the resistor R9 are connected to the gate terminal of the thyristor 202. The other end of the resistor R9 is connected to the collector of the transistor Tr5. The emitter of the transistor Tr5 is connected to the other end of the resistor R8, one end of a capacitor C20, one end of a resistor R21, and the anode of a zener diode D19.

The other end of the resistor R21 is connected to the anode of a diode D22. The diode D22 is an example of a rectifying element. The cathode of the diode D22 is connected to one end of the heater 11 and the N pole of the AC power source 201. The zener diode D19, the capacitor C20, the resistor R21 and the diode D22 form a direct current (DC) voltage source 218.

The L pole of the AC power source 201 is connected to one end of a coil L11. The other end of the coil L11 is connected to the cathode of the zener diode D19, the other end of the capacitor C20, and the T1 terminal of the bidirectional thyristor 202.

The T2 terminal of the bidirectional thyristor 202 is connected to one end of a protective element 210. The other end of the protective element 210 is connected to the other end of the heater 11. The protective element 210 is a device (e.g., thermal fuse or thermostat) that prevents excessive temperature rise of the heater 11.

A zero cross sensing circuit 220, which senses a zero cross of the AC voltage supplied from the AC power source 201, is connected to an input port of the CPU 15. The input port of the CPU 15 is connected to one end of a resistor R16. The other end of the resistor R16 is connected to one end of a capacitor C17, one end of a resistor R15, and the collector of a phototransistor in a photocoupler 214. The other end of the resistor R15 is connected to the reference power source Vcc. The emitter of the phototransistor in the photocoupler 214 is grounded. The anode of a light emitting diode in the photocoupler 214 is connected to the L pole through a resistor R12. The cathode of the light emitting diode in the photocoupler 214 is connected to the N pole. The cathode of a diode D13 is connected to the anode of the light emitting diode in the photocoupler 214. The anode of the diode D13 is connected to the cathode of the light emitting diode in the photocoupler 214.

2-2. Circuit Operation

By the CPU 15 outputting a high state control signal (hereinafter, referred to as FSRD signal) to the base of the transistor Tr3, the transistor Tr3 enters a conducting state. When the transistor Tr3 enters a conducting state, current flows from the reference power source Vcc through the resistor R6, and the photocoupler 204 enters a conducting state. With this, current flows through the resistor R7 and the resistor R8, and the transistor Tr5 turns on. A gate trigger voltage is applied between the T1 terminal of the bidirectional thyristor 202 and the gate terminal of the bidirectional thyristor 202 from the capacitor C20, and gate trigger current flows through the gate terminal. As a result, the T1 terminal and the T2 terminal of the bidirectional thyristor 202 enter a conducting state, and power is supplied to the heater 11 from the AC power source 201. At this time, the CPU 15 executes control in control cycles that are in units of one half wave of the AC voltage of the AC power source 201.

The temperature sensor 20 may be, for example, a chip-type NTC thermistor. NTC is an abbreviation of negative temperature coefficient. That is, the resistance value of the temperature sensor 20 decreases or increases according to an increase or a decrease in temperature. A reference voltage supplied from the reference power source Vcc is divided by a voltage dividing circuit formed by a resistor R23 and the internal resistance of the temperature sensor 20. The divided voltage is inputted to the CPU 15 through a resistor R24 and a capacitor C25. The CPU 15 detects temperature based on the input voltage. The temperature sensor 20 is arranged in a position in which a temperature correlated with the temperature (hereinafter, Tj) of the junctions of the bidirectional thyristor 202 can be measured. The CPU 15 senses, measures, or estimates the temperature Tj using the temperature sensor 20. In the following, the measured value or the estimated value of the temperature Tj will be referred to as the estimated Tj value.

The coil L11 prevents switching noise that is generated when the bidirectional thyristor 202 starts conduction from being emitted to the outside of the image forming apparatus 100.

In the zero cross sensing circuit 220, when power is supplied from the L pole of the AC power source 201, current flows through the light emitting diode of the photocoupler 214 through the resistor R12, and the light emitting diode emits light. When the light emitting diode of the photocoupler 214 emits light, light enters the phototransistor of the photocoupler 214, and current flows through the phototransistor. That is, current flows from the reference power source Vcc connected through the resistor R15 to the frame ground (GND) through the phototransistor of the photocoupler 214. Then, the capacitor C17 is charged, and a zero cross signal (hereinafter, ZEROX signal) is outputted to the CPU 15 through the resistor R16. At this time the zero cross sensing circuit 220 outputs a high state or low state ZEROX signal to the CPU 15 according to the voltage waveform of the AC power source 201. The CPU 15 outputs the FSRD signal in synchronization with the ZEROX signal, that is, in synchronization with the sensing result of the zero cross sensing circuit 220. With this, it is possible to cause the bidirectional thyristor 202 to turn on around the zero cross point of the AC power source 201.

2-3. Charging and Discharging Operation of Capacitor C20

2-3-1. Charging Operation

When current flows in the path of a current loop LP1 from the L pole of the AC power source 201, charge is stored in the capacitor C20. A maximum voltage to be applied across the capacitor C20 is limited by the Zener voltage Vz of the Zener diode D19 (hereinafter, referred to as the Vz voltage). Therefore, the capacitor C20 is charged such that the maximum value of the voltage across the capacitor C20 is the Vz voltage. When current is supplied from the N pole of the AC power source 201, reverse bias is applied to the diode D22. With this, current attempting to flow into the capacitor C20 through the current loop LP1 is restricted, and charge current does not flow into the capacitor C20.

2-3-2. Discharging Operation

When current is supplied from the L pole or the N pole of the AC power source 201, while a high state FSRD signal is being outputted by the CPU 15, the capacitor C20 discharges charge to cause the gate trigger current to flow to the bidirectional thyristor 202. The capacitor C20 may cause the bidirectional thyristor 202 to turn on while current is being supplied from the L pole of the AC power source 201. In this case, the capacitor C20 is charged by the AC power source 201 while discharging charge. With this, the gate trigger current flows through the bidirectional thyristor 202. The capacitor C20 may cause the bidirectional thyristor 202 to turn on while current is being supplied from the N pole of the AC power source 201. In this case, the capacitor C20 discharges charge, and the gate trigger current of the bidirectional thyristor 202 flows.

2-4. Gate Trigger Current of Bidirectional Thyristor 202

As illustrated in FIG. 2, the DC voltage source 218 is constituted by the Zener diode D19 and the capacitor C20. At this time, by the CPU 15 causing the FSRD signal to enter a high state, the capacitor C20 discharges charge. Therefore, the gate trigger current flows in the direction of a current loop LP2, that is, to the bidirectional thyristor 202, and the T1 terminal and the T2 terminal of the bidirectional thyristor 202 enter a conducting state. When the CPU 15 causes the FSRD signal to enter a low state, the transistor Tr3 and the transistor Tr5 are turned off, and the gate trigger current no longer flows.

Meanwhile, the gate trigger current (current value) used for the T1 terminal and the T2 terminal to enter a conducting state changes depending on the temperature Tj of the bidirectional thyristor 202.

Figures 3, 4:
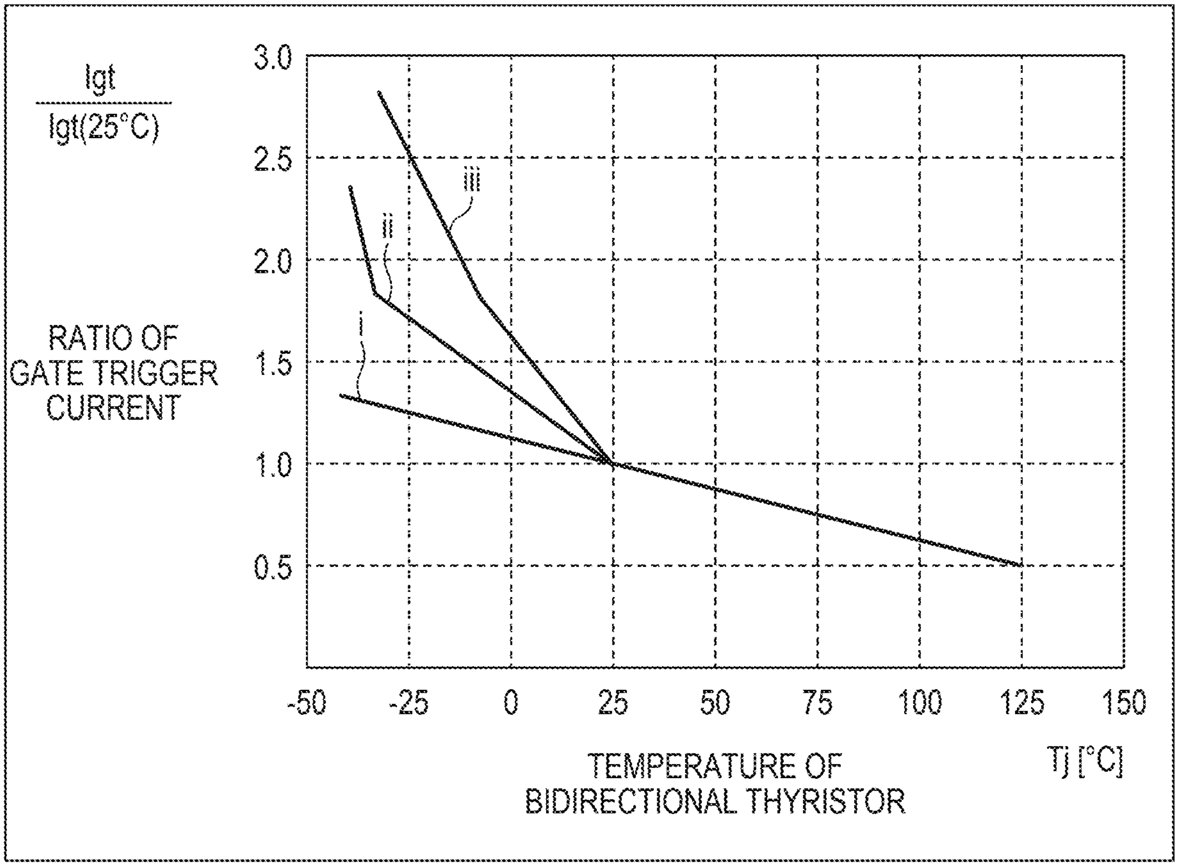
FIG. 3 is a diagram illustrating the characteristics of a bidirectional thyristor.
FIG. 4 is a diagram illustrating a table holding a correspondence relationship between temperature and the number of outputs.

FIG. 3 is a graph illustrating characteristics between the temperature of junctions of the bidirectional thyristor 202 and the gate trigger current. Here, the potential of the T1 terminal of the bidirectional thyristor 202 is a reference potential. In FIG. 3, the respective characteristics of three trigger modes i, ii, and iii are illustrated. The horizontal axis represents the temperature Tj of the bidirectional thyristor 202. The vertical axis illustrates a gate trigger current ratio for when Tj=25° C. is assumed as a reference. As illustrated in FIG. 3, the gate trigger current increases as the temperature Tj of the bidirectional thyristor 202 decreases.

The amount of charge that can be stored by the capacitor C20 is limited. Therefore, it is preferable to adjust the number N of outputs of the FSRD signal (gate trigger current) outputted within a half cycle according to the temperature Tj of the bidirectional thyristor 202. That is, the CPU 15 may reduce the number N of outputs as the temperature Tj of the bidirectional thyristor 202 decreases. If the number N of outputs is maintained despite the temperature Tj being low, problems will arise. For example, the waveform distortion of an AC voltage Vac supplied from the AC power source 201 causes the bidirectional thyristor 202 to turn off and the supply of power to the heater 11 to stop. As a result, the heat generation of the heater 11 becomes unstable, and the capability to fix the toner image may decrease.

Meanwhile, according to the first embodiment, the CPU 15 adjusts the number N of outputs according to the temperature Tj of the bidirectional thyristor 202. As a result, the heat generation of the heater 11 becomes stable, and the capability to fix the toner image is maintained.

2-5. Gate Trigger Signal

FIG. 4 illustrates a table 400 stored in the memory 22 of the CPU 15. The table 400 indicates a correspondence relationship between the estimated Tj value of the bidirectional thyristor 202 and the number N of outputs of a high state FSRD signal in one half wave of the AC power source 201.

2-5-1. When Estimated Tj Value is 25° C. or More

Figure 5A:
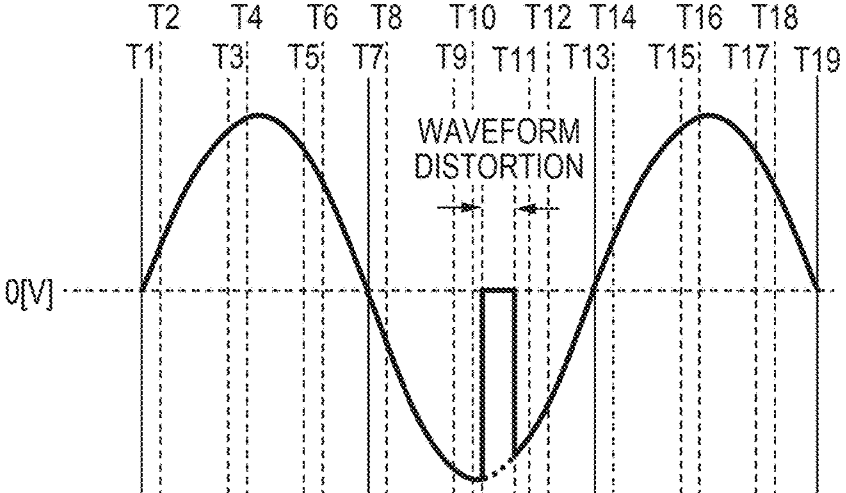
FIGS. 5A to 5D are diagrams illustrating various waveforms involved in the power source.
Figure 5B:
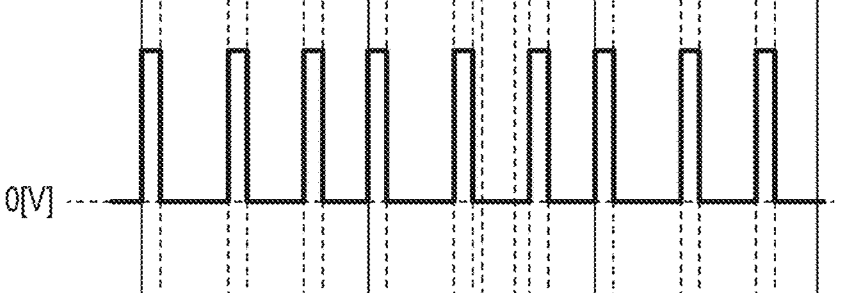
Figure 5C:
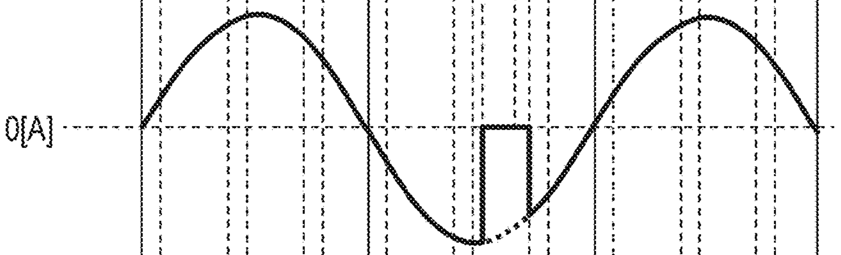
Figure 5D:
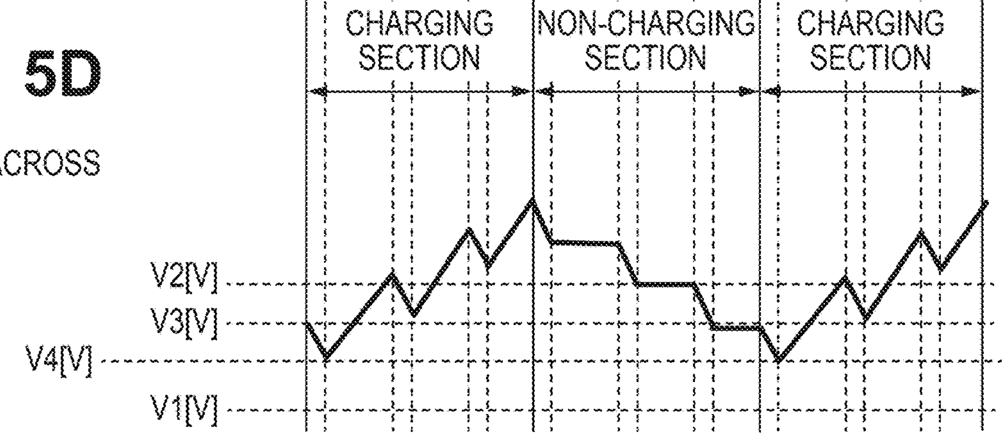

When the estimated Tj value is 25° C. or more, the number N of outputs is three times. FIG. 5A illustrates the waveform of the AC voltage supplied from the AC power source 201. FIG. 5B illustrates the waveform of the FSRD signal outputted from the CPU 15. FIG. 5C illustrates the current waveform of the bidirectional thyristor 202. FIG. 5D illustrates the waveform of the voltage across the capacitor C20.

V1 in FIG. 5D is the voltage across the capacitor C20 at which the gate trigger current used to turn on the bidirectional thyristor 202 when Tj is 25° C. can be generated. V2 is the value of the voltage across the capacitor C20 at which the gate trigger current used to turn on the bidirectional thyristor 202 when Tj of the bidirectional thyristor 202 is 0° C. can be generated.

A period from timing T1 to T7, and a period from T13 to T19 are periods for charging the capacitor C20. A period from T7 to T13 is a non-charging period.

As illustrated in FIG. 5A, waveform distortion occurs in the AC voltage Vac of the AC power source 201 in a period from T10 to T11. As a result, the AC voltage Vac becomes 0 [V]. Accordingly, as illustrated in FIG. 5C, the current flowing through the bidirectional thyristor 202 also becomes 0 [A]. However, as illustrated in FIGS. 5B and 5C, by the FSRD signal entering a high state at T11, the gate trigger current flows to the bidirectional thyristor 202, and conduction starts again.

As illustrated in FIG. 5B, the FSRD signal enters a high state in predetermined periods. The predetermined periods include a period from T1 to T2, a period from T3 to T4, a period from T5 to T6, a period from T7 to T8, a period from T9 to T10, a period from T11 to T12, a period from T13 to T14, a period from T15 to T16, and a period from T17 to T18. As such, the gate trigger current flows to the bidirectional thyristor 202 a plurality of times in a half cycle. As a result, conduction failure of the bidirectional thyristor 202 due to waveform distortion of the AC power source 201 is prevented. Meanwhile, the capacitor C20 discharges to cause the gate trigger current to flow, and so, the voltage across the capacitor C20 decreases. The capacitor C20 charges in a period from T2 to T3, a period from T4 to T5, a period from T6 to T7, a period from T14 to T15, a period from T16 to T17, and a period from T18 to T19. The minimum value of the voltage across the capacitor C20 is V4 at T2 and T14. As illustrated in FIG. 5D, V4>V1. Therefore, when Tj of the bidirectional thyristor 202 is 25° C. or more, the number N of outputs is set to three times. With this, even if waveform distortion occurs at any timing, the capacitor C20 can cause the gate trigger current to flow to the bidirectional thyristor 202.

In FIG. 5D, V3 is the voltage across the capacitor at a given timing for when the number N of outputs is three. In this case, the voltage across the capacitor is V3, which is below V2, in a period from T12 to T13. That is, when the estimated Tj value is 0° C., the capacitor cannot turn on the bidirectional thyristor 202.

2-5-2. When Estimated Tj Value is 25° C. or Lower

Figures 6A, 6B, 6C, 6D:
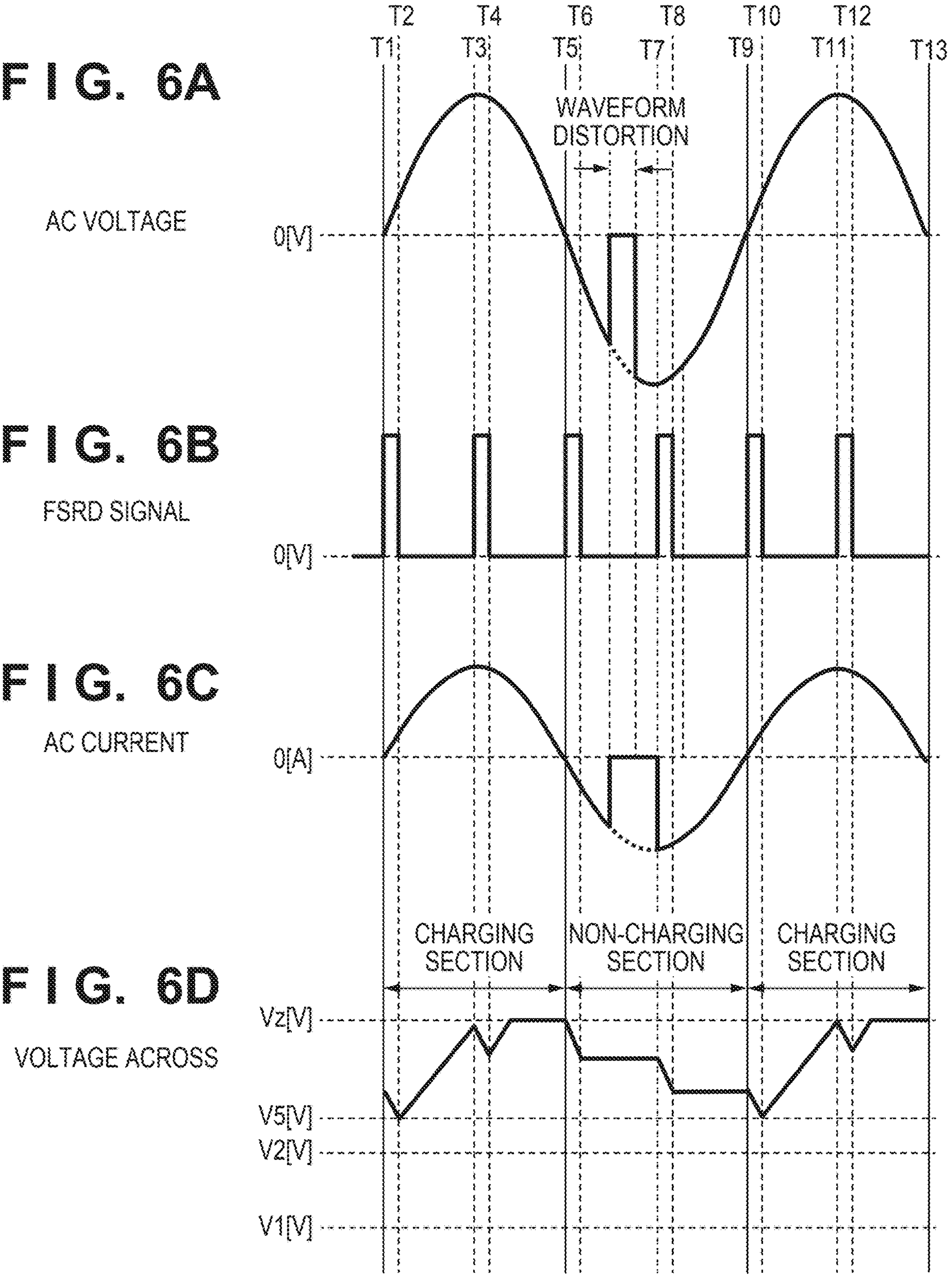
FIGS. 6A to 6D are diagrams illustrating various waveforms involved in the power source.

As one example, assume that the estimated Tj value is 0° C. The CPU 15 refers to the table 400 and determines the number N of outputs for when the estimated Tj value is 0° C. to two times. FIG. 6A illustrates the waveform of the AC voltage supplied from the AC power source 201. FIG. 6B illustrates the waveform of the FSRD signal. FIG. 6C illustrates the waveform of the gate trigger current for the bidirectional thyristor 202. FIG. 6D illustrates the waveform of the voltage across the capacitor C20.

In FIG. 6D, the definitions of V1 and V2 are as described in connection with FIG. 5D. A period from T1 to T5, and a period from T9 to T13 are periods for charging the capacitor C20. A period from T5 to T9 is a non-charging period.

As illustrated in FIG. 6A, waveform distortion occurs in the AC voltage Vac supplied from the AC power source 201 in a period from T6 to T7. As a result, the AC voltage Vac becomes 0 [V]. As illustrated in FIG. 6C, the current of the bidirectional thyristor 202 also becomes 0 [A]. However, as illustrated in FIGS. 6B and 6C, by the FSRD signal entering a high state at T7, the gate trigger current flows to the bidirectional thyristor 202, and the bidirectional thyristor 202 is turned on again.

As illustrated in FIG. 6B, the FSRD signal enters a high state in a period from T1 to T2, a period from T3 to T4, a period from T5 to T6, a period from T7 to T8, a period from T9 to T10, and a period from T11 to T12. Therefore, the gate trigger current flows to the bidirectional thyristor 202, and the influence of waveform distortion is reduced. Meanwhile, the capacitor C20 discharges and the voltage thereacross decreases. The capacitor C20 is charged in a period from T2 to T3, a period from T4 to T5, a period from T10 to T11, and a period from T12 to T13. Further, the voltage across the capacitor C20 reaches the Zener voltage Vz of the Zener diode D19 in the period from T4 to T5 and the period from T12 to T13.

The minimum value of the voltage across the capacitor C20 is V5 at T2 and T10. As illustrated in FIG. 6D, V5>V2, and so, even when the temperature Tj of the bidirectional thyristor 202 is 0° C., the capacitor C20 can cause the gate trigger current to flow.

According to the first embodiment, the CPU 15 adjusts the number N of outputs the FSRD signal based on the estimated Tj value obtained by the temperature sensor 20. The number N of outputs may be set to as large a value as possible so long as the bidirectional thyristor 202 stably conducts even if waveform distortion occurs. With this, the heater 11 is stably supplied with power, and so, failure to increase the temperature of the fixing device 30 is reduced.

In the first embodiment, when the estimated Tj value of the bidirectional thyristor 202 is 25° C. or more, the number N of outputs is set to three times. When the estimated Tj value is less than 25° C., the number N of outputs is set to two times. However, these are only examples. The correspondence relationship between the estimated Tj value of the bidirectional thyristor 202 and the number N of outputs of the FSRD signal may be another relationship. That is, this correspondence relationship is determined according to the capabilities of the heater 11 and the temperature-dependent characteristics of the capacitor C20.

In the first embodiment, the temperature sensor 20 is assumed to be a chip-type NTC thermistor, but this also is only one example. Any temperature sensor may be adopted so long as it is capable of measuring or estimating the temperature Tj of the bidirectional thyristor 202.

Second Embodiment

In the first embodiment, the temperature Tj of the junctions of the bidirectional thyristor 202 is adopted as a state parameter that affects the capability to supply the gate trigger current. However, there are other parameters that serve as state parameters that affect the capability to supply the gate trigger current. Therefore, in a second embodiment, the operational history of the image forming apparatus 100 is considered as a state parameter. There may be a plurality of state parameters. Therefore, in the second embodiment, a combination of the estimated Tj value and the operational history (hereinafter, cumulative energization time) is adopted as state parameters. The CPU 15 adjusts the number N of outputs according to these. In the second embodiment, the description of the first embodiment is incorporated for the description of matters common to the first embodiment.

As described in the first embodiment, the capacitor C20 serves as a DC voltage source that provides the gate trigger current to the bidirectional thyristor 202. Current I, which flows through the capacitor C20, is expressed by the following equation.

$$I = C \times \frac{V}{t} \quad \text{Eq 1}$$

Here, C is the capacitance of the capacitor C20. V is the voltage across the capacitor C20. t is time. As indicated by Equation Eq1, when the capacitance C of the capacitor C20 decreases, the current I that flows to and from the capacitor C20 decreases. That is, as described in the first embodiment, the current that flows along the current loop LP1 and charges the capacitor C20 decreases.

Figures 7, 8:
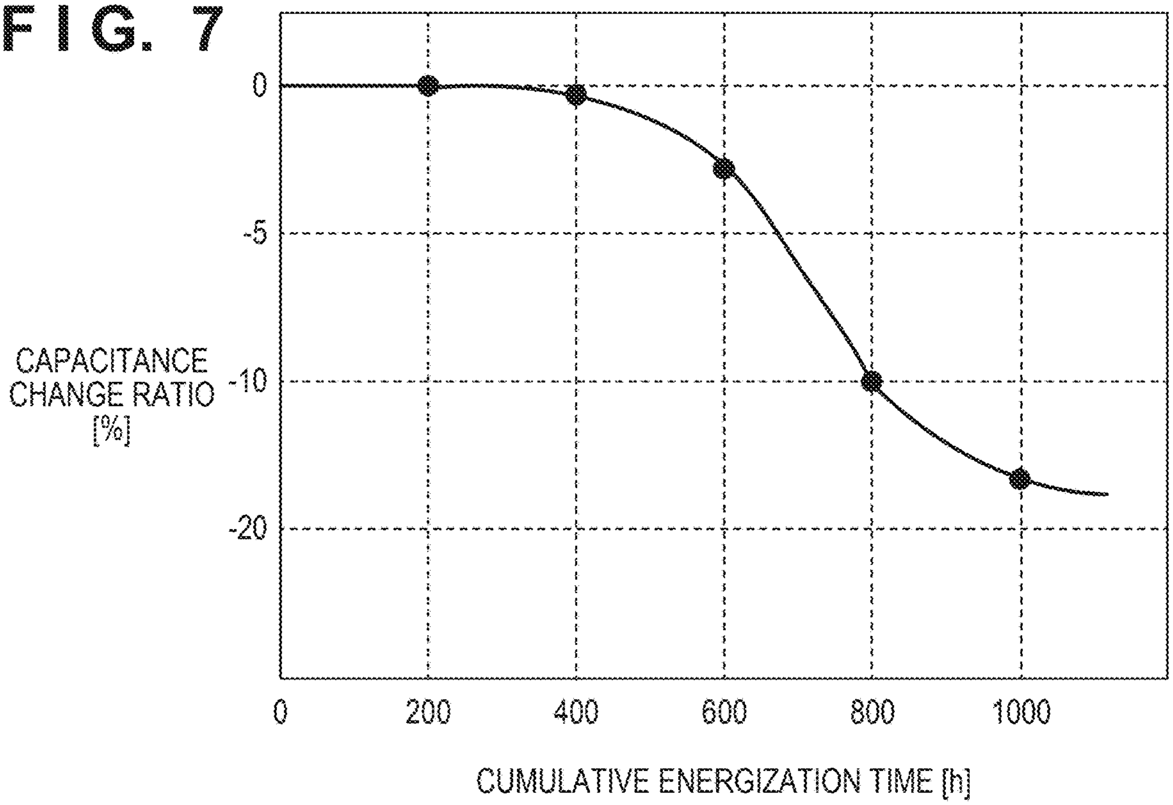
FIG. 7 is a diagram illustrating a change in capacitance of a capacitor.
FIG. 8 is a diagram illustrating a table holding a correspondence relationship between temperature and a number of outputs.

Meanwhile, as illustrated in FIG. 7, the capacitor C20 has a characteristic that the capacitance decreases according to the cumulative energization time (aging). The horizontal axis in FIG. 7 indicates the cumulative energization time [h]

of the image forming apparatus 100. The vertical axis indicates the capacitance change ratio [%] of the capacitor C20.

For example, if the cumulative energization time is 800 h, the capacitance change ratio of the capacitor C20 is −10%. That is, the capacitance of the capacitor C20 when the cumulative energization time is 800 h decreases by about 10% from the capacitance of the capacitor C20 when the energization time is 0 h.

FIG. 8 illustrates a table 800, which holds the number N of outputs that corresponds to a combination of the estimated Tj value of the bidirectional thyristor 202 and the cumulative energization time of the image forming apparatus 100. The table 800 is stored in the memory 22 of the CPU 15. Regarding the cumulative energization time, for example, a time (cumulative driving time) during which the CPU 15 rotationally drives the motor 21 is measured by the timer 23, and the cumulative energization time of the image forming apparatus 100 is calculated based on the measured value. The cumulative energization time may be stored and held, for example, in the memory 22 of the CPU 15. The cumulative energization time may be replaced with the number of driving pulses inputted to the motor 21 or the number of pulses outputted from the motor 21 (count value).

The table 800 holds four control patterns P1 to P4. If the estimated Tj value is 25° C. or more and the cumulative energization time is less than 800 [h], the number N of outputs is determined to be five times (pattern P1). If the estimated Tj value is 25° C. or more and the cumulative energization time is 800 [h] or more, the number N of outputs is determined to be four times (pattern P2). If the estimated Tj value is less than 25° C. and the cumulative energization time is less than 800 [h], the number N of outputs is determined to be three times (pattern P3). If the estimated Tj value is less than 25° C. and the cumulative energization time is 800 [h] or more, the number N of outputs is determined to be two times (pattern P4).

According to the second embodiment, the CPU 15 references the table 800 based on the combination of the estimated Tj value and the cumulative energization time and adjusts the number N of outputs. For example, the number N of outputs may be set to be as large a value as possible. With this, even if waveform distortion occurs in the AC voltage, it is possible to make the bidirectional thyristor 202 stably conduct. As a result, the heater 11 is stably supplied with power, and so, failure to increase the temperature of the fixing device 30 is reduced.

In the second embodiment, the CPU 15 estimates the cumulative energization time (operational history) of the image forming apparatus 100 from the cumulative driving time of the motor 21. However, this is only one example. For example, the CPU 15 may count the cumulative number of printed sheets (number of printed sheets) using the memory 22 or the like. The CPU 15 may calculate the cumulative energization time from this count result or use the count result in place of the cumulative energization time. Either way, any parameter can be used to adjust the number N of outputs so long as it correlates with the cumulative energization time of the capacitor C20.

Third Embodiment

In a third embodiment, the maximum value (peak value) of the AC voltage Vac supplied from the AC power source 201 is considered as a state parameter. The CPU 15 adjusts the number N of outputs according to a combination of the estimated Tj value and the peak value. The peak value alone may be adopted as a state parameter.

Figure 9:
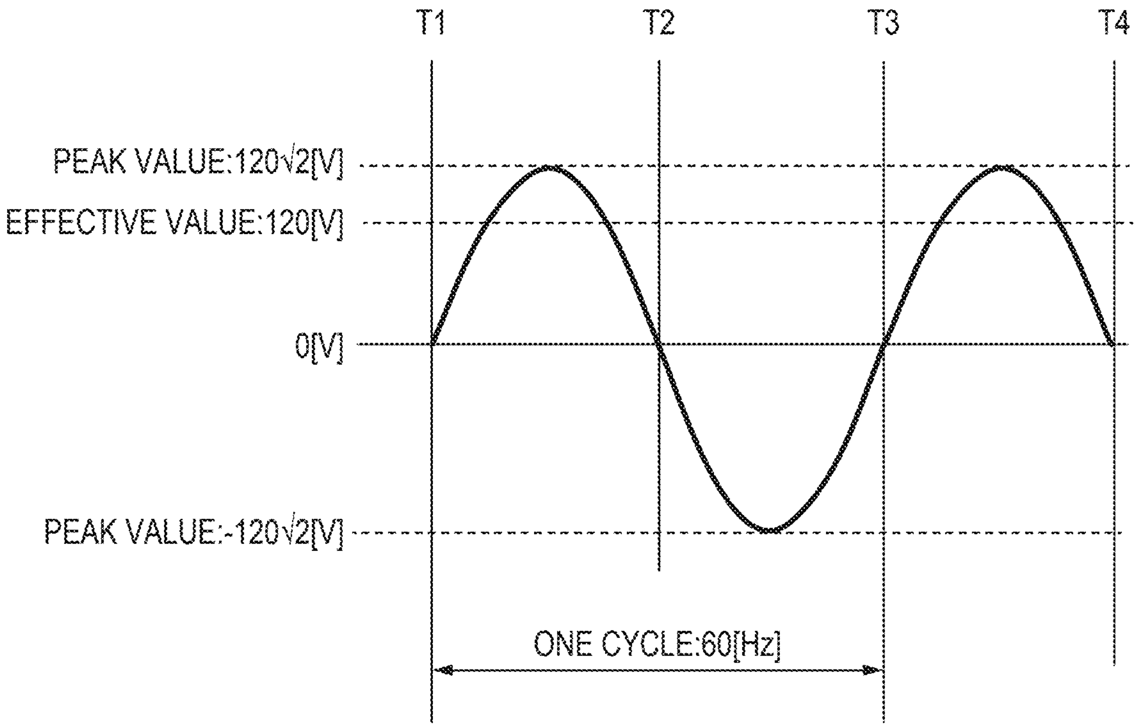
FIG. 9 is a diagram illustrating a waveform of AC voltage.

FIG. 9 illustrates a voltage waveform of the AC power source 201. The horizontal axis indicates time. The vertical axis indicates the voltage value. The frequency of the AC voltage is 60 [Hz]. The effective value is 120 [V]. The peak value is $120\sqrt{2}$ [V].

Figure 10:
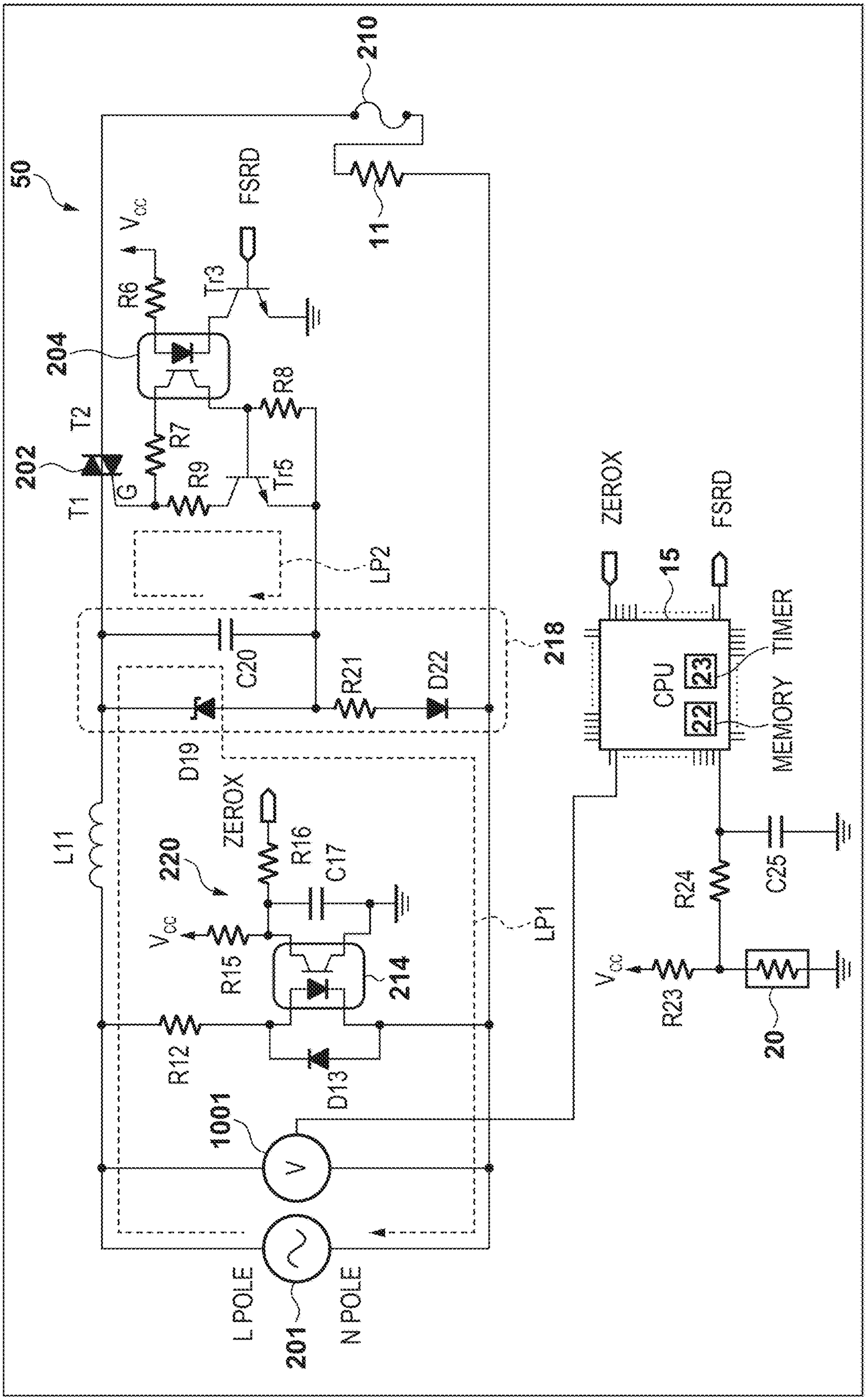
FIG. 10 is a circuit diagram illustrating the power source.

FIG. 10 illustrates the power source 50 of the third embodiment. Compared to FIG. 2, in FIG. 10, a voltage sensing circuit 1001 is connected between the L pole and the N pole of the AC power source 201. The voltage sensing circuit 1001 is a measuring circuit that measures the AC voltage Vac. The voltage sensing circuit 1001 may be realized, for example, by at least two voltage dividing resistors that divide the AC voltage Vac into a voltage (sensed voltage Vsns) that can be inputted to the CPU 15. The sensed voltage Vsns is proportional to the AC voltage Vac and indicates the AC voltage Vac. The output of the voltage sensing circuit 1001 is connected to an input port of the CPU 15 that comes with an A/D converter. The CPU 15 monitors the AC voltage Vac sensed by the voltage sensing circuit 1001.

As described in the first embodiment, when power is supplied from the L pole of the AC power source 201, current flows along the current loop LP1, and thereby, charge is stored in the capacitor C20. The current I, which flows to and from the capacitor C20, is expressed by the following equation.

$$I = \frac{Vac}{\sqrt{R^2 + \left(\frac{1}{\omega C}\right)^2}} \qquad \text{Eq 2}$$

Here, Vac is the voltage of the AC power source 201. R is the resistance value of the resistor R21. C is the capacitance of the capacitor C20. @ is the angular frequency [rad/s] of the AC voltage.

According to Equation Eq2, it can be seen that when the AC voltage Vac decreases, the current I flowing through the capacitor C20 decreases. As described in the first embodiment, this means that the current that flows along the path of the current loop LP1 and charges the capacitor C20 decreases.

FIG. 11 illustrates a table 1100 stored in the memory 22. The table 1100 holds the number N of outputs that corresponds to a combination of the estimated Tj value and the AC voltage Vac (sensed voltage Vsns). In this example, there are four control patterns P5 to P8.

As illustrated in FIG. 11, when the AC voltage Vac is 100 [V] or more and the estimated Tj value is 25° C. or more, the CPU 15 determines the number N of outputs to be five times (pattern P5). When the AC voltage Vac is 100 [V] or more and the estimated Tj value is less than 25° C., the CPU 15 determines the number N of outputs to be three times (pattern P7). When the AC voltage Vac is less than 100 [V] or and the estimated Tj value is 25° C. or more, the CPU 15 determines the number N of outputs to be four times (pattern P6). When the AC voltage Vac is less than 100 [V] or and the estimated Tj value is less than 25° C., the CPU 15 determines the number N of outputs to be two times (pattern P8).

According to the third embodiment, the number N of outputs is adjusted based on the combination of the estimated Tj value and the AC voltage Vac. Here, the number N of outputs may be set to as large a value as possible so long as the bidirectional thyristor 202 stably conducts. With this, even if waveform distortion occurs in the AC voltage Vac, the heater 11 will stably generate heat, and temperature failure of the fixing device 30 will be reduced.

In the third embodiment, it is assumed that the frequency of the AC voltage Vac is 60 [Hz], the effective value is 120 [V], and the peak value is $120\sqrt{2}$ [V]. Further, as illustrated in FIG. 11, it is assumed that the threshold of the AC voltage Vac is 100 [V]. However, these numerical values are only examples. The parameters related to the AC voltage Vac are appropriately changed depending on the specifications of the commercial AC power source for each destination of the image forming apparatus 100.

In the third embodiment, the voltage of the AC voltage Vac is directly sensed by the voltage sensing circuit 1001. However, this is only one example. Other physical parameters useful in estimating the AC voltage Vac may be sensed.

Fourth Embodiment

In the first embodiment, the temperature (e.g., estimated Tj value) of the bidirectional thyristor 202 is adopted as a state parameter. In the second embodiment, the combination of the temperature (e.g., estimated Tj value) of the bidirectional thyristor 202 and the cumulative energization time of the capacitor C20 are adopted as state parameters. In the third embodiment, the combination of the temperature (e.g., estimated Tj value) of the bidirectional thyristor 202 and the voltage (peak value) of the AC voltage Vac are adopted as state parameters. However, these are only examples.

The cumulative energization time of the capacitor C20 alone may be used as a state parameter. The AC voltage Vac alone may be used as a state parameter. Further, a combination of the cumulative energization time of the capacitor C20 and the AC voltage Vac may be adopted as state parameters. Further, a combination of the temperature (e.g., estimated Tj value) of the bidirectional thyristor 202, the cumulative energization time of the capacitor C20, and the AC voltage Vac may be adopted as state parameters. In any case, a table, an equation or a program module that converts a state parameter into the number N of outputs is stored in the memory 22 and referenced by the CPU 15. In addition, an equation or a program module may be adopted instead of a table.

Fifth Embodiment

1. Functions Realized by CPU

Figure 12:
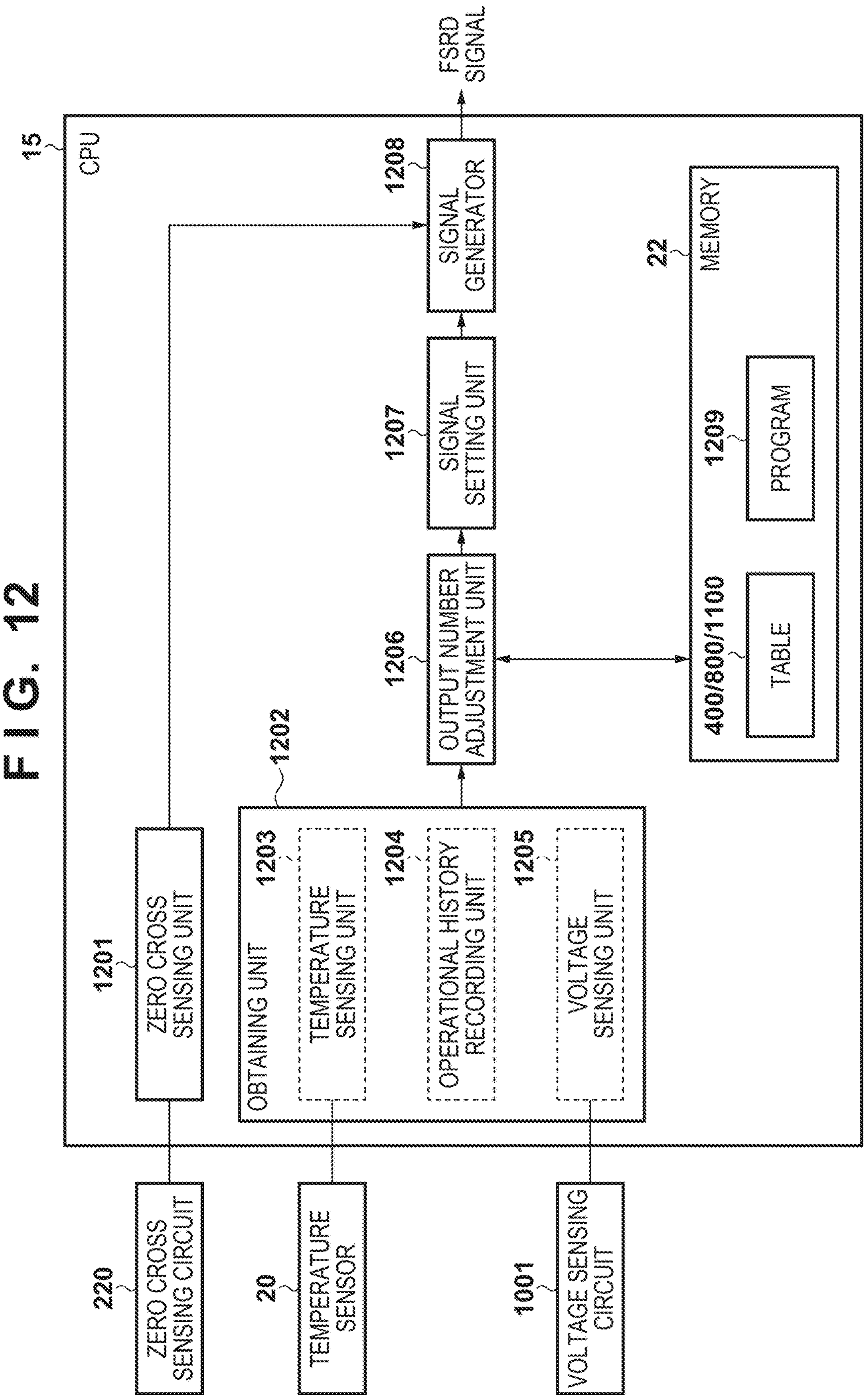
FIG. 12 is a diagram illustrating functions of a CPU.

FIG. 12 illustrates functions realized by the CPU 15 executing a program 1209. A zero cross sensing unit 1201 senses or recognizes a zero cross of the AC voltage Vac based on the ZEROX signal outputted from the zero cross sensing circuit 220. The zero cross sensing unit 1201 outputs a sensing signal to a signal generator 1208 each time a zero cross is recognized.

An obtaining unit 1202 obtains a state parameter. A temperature sensing unit 1203 senses or estimates the temperature (estimated Tj value) of the junctions of the bidirectional thyristor 202 based on a detection signal outputted by the temperature sensor 20. An operational history recording unit 1204 records the cumulative operation time of the motor 21 (cumulative energization time of the capacitor C20) using the timer 23 and stores the cumulative operation time in the ROM area of the memory 22. As described above, the cumulative number of printed sheets may be recorded in the memory 22. A voltage sensing unit 1205 senses or estimates the AC voltage Vac based on the sensed voltage Vsns outputted from the voltage sensing circuit 1001.

An output number adjustment unit 1206 adjusts the number N of outputs according to a state parameter obtained by the obtaining unit 1202. At this time, the output number adjustment unit 1206 may determine the number N of outputs that corresponds to the state parameter by referencing the table 400, 800, or 1100, or the like.

A signal setting unit 1207 determines a period ton in which the FSRD signal is in a high state and a period toff in which the FSRD signal is in a low state based on the number N of outputs and sets these in the signal generator 1208. For example, the signal setting unit 1207 measures a time from a preceding zero cross to a subsequent zero cross (half cycle) and divides the half cycle by N to obtain a sum of ton and toff. It is assumed that a ratio of ton to toff (on duty ratio) is stored in advance in the memory 22. The signal setting unit 1207 references this ratio and determines ton and toff. The signal generator 1208 outputs the number N of outputs of the FSRD signal each time a zero cross is sensed by the zero cross sensing unit 1201. That is, the signal generator 1208 outputs a pulse-shaped FSRD signal based on the period ton in which the FSRD signal is in a high state and the period toff in which the FSRD signal is in a low state.

2. Flowchart

Figure 13:
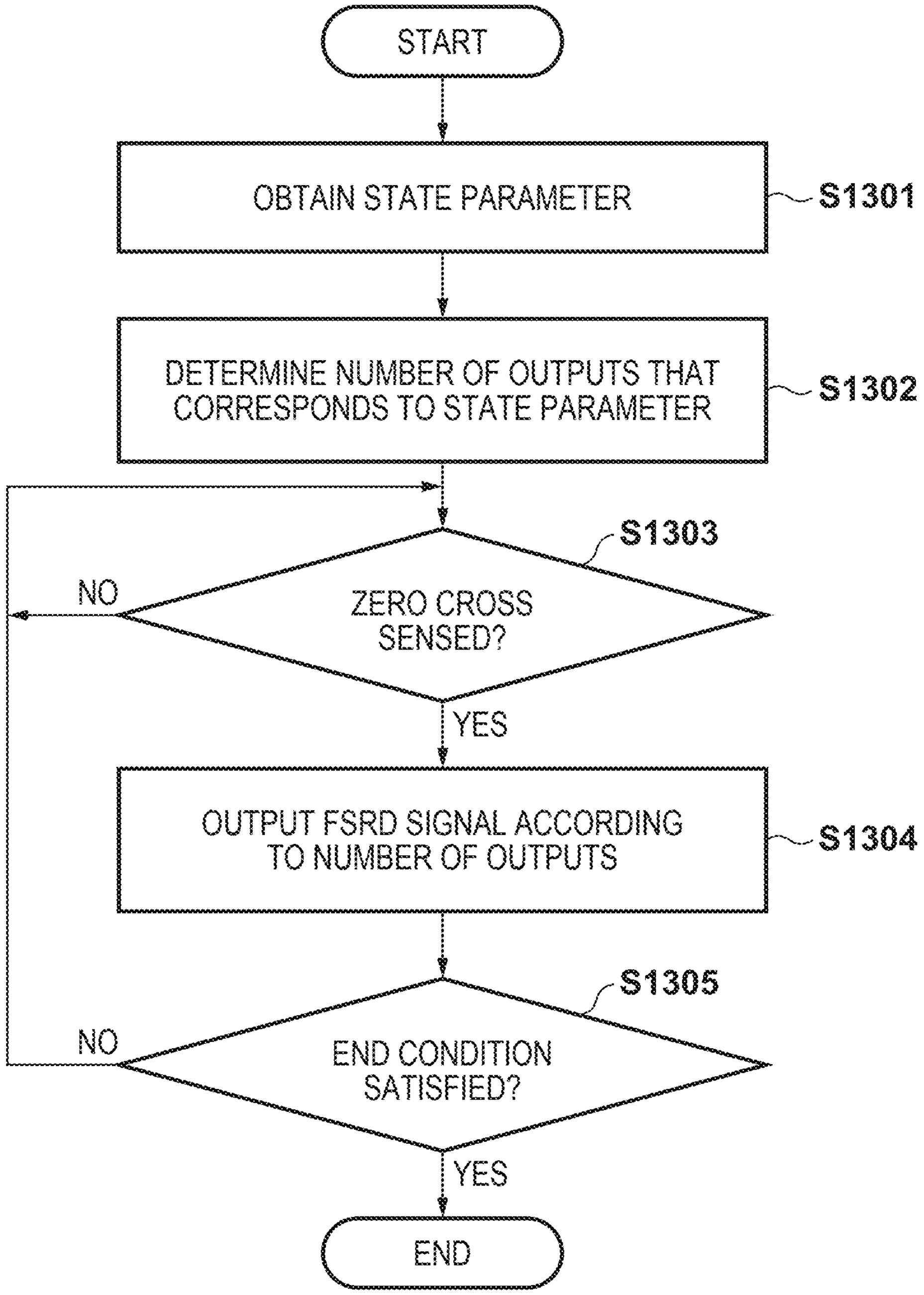
FIG. 13 is a flowchart for explaining a control method.

FIG. 13 illustrates a control method to be executed by the CPU 15 according to the program 1209.

In step S1301, the CPU 15 (obtaining unit 1202) obtains a state parameter. The state parameter includes at least one among the temperature (e.g., estimated Tj value) of the bidirectional thyristor 202, the cumulative energization time of the capacitor C20, and the AC voltage Vac.

In step S1302, the CPU 15 (output number adjustment unit 1206) determines the number N of outputs that corresponds to the obtained state parameter. For example, the output number adjustment unit 1206 may obtain the number N of outputs that corresponds to the state parameter by referencing the table 400, 800, or 1100.

In step S1303, the CPU 15 (zero cross sensing unit 1201) determines whether a zero cross is sensed for the AC voltage Vac. When a zero cross is sensed, the CPU 15 proceeds from step S1303 to step S1304.

In step S1304, the CPU 15 (signal setting unit 1207 and signal generator 1208) outputs a pulse-shaped FSRD signal according to the number N of outputs.

In step S1305, the CPU 15 determines whether a condition for ending the control method is satisfied. The end condition may be, for example, that image formation on the sheet 7 has been completed in the image forming apparatus 100, and even after waiting for a predetermined time, the next print job has not been inputted. If the end condition is not satisfied, the CPU 15 returns from step S1305 to step S1303 and continues to supply power to the heater 11. When the end condition is satisfied, the CPU 15 stops supplying power to the heater 11.

Technical Concepts Derived from Embodiments (Item 1)

The heater 11 functions as a heating member that applies heat to a toner image formed on a sheet and fixes the toner image to the sheet. The bidirectional thyristor 202 controls whether to supply power supplied from the AC power source 201 to the heating member. The CPU 15 and the obtaining unit 1202 obtain a state parameter, which includes at least one among the temperature (estimated Tj value) of the bidirectional thyristor 202, the AC voltage Vac supplied from the AC power source 201, and the operational history of the DC voltage source (e.g., the capacitor C20). The CPU 15 controls the number N of outputs of a control signal (gate trigger current based on the FSRD signal) outputted from the DC voltage source to the gate terminal G in a half cycle of the AC voltage Vac according to the state parameter. With this, it is possible to make the bidirectional thyristor 202 stably conduct while preventing an increase in cost. As a result, the heat generation of the heater 11 becomes stable, and the fixing capability of the fixing device 30 is maintained.

(Item 2) Temperature

The obtaining unit 1202 may be configured to obtain a measured value or an estimated value of the temperature Tj of the bidirectional thyristor 202. As described in the first embodiment, the CPU 15 may control the number N of outputs of the control signal using the measured value or the estimated value of the temperature Tj of the bidirectional thyristor 202 as a state parameter. With this, the number N of outputs is adjusted according to the temperature Tj of the junctions of the bidirectional thyristor 202, and it is possible to make the bidirectional thyristor 202 stably conduct.

(Item 3) Temperature

The memory 22 and the table 400 function as a memory that stores in advance a correspondence relationship between the measured value or the estimated value of the temperature Tj of the bidirectional thyristor 202 and the number N of outputs of the control signal. The CPU 15 may determine the number N of outputs of the control signal that corresponds to the temperature Tj of the bidirectional thyristor 202 by referencing the correspondence relationship stored in the memory.

(Item 4) AC Voltage

The obtaining unit 1202 may include a measuring circuit (e.g., the voltage sensing circuit 1001) that measures the AC voltage Vac supplied from the AC power source 201. The CPU 15 may control the number N of outputs of the control signal according to the AC voltage Vac measured by the measuring circuit as a state parameter. When the AC voltage Vac decreases, the voltage across the capacitor C20 also decreases, and so, the gate trigger current also decreases. Therefore, by adjusting the number N of outputs according to the AC voltage Vac, it is possible to make the bidirectional thyristor 202 stably conduct.

(Item 5) AC Voltage

The memory 22 and the table 1100 function as a memory that stores in advance a correspondence relationship between the AC voltage Vac and the number N of outputs. The CPU 15 may determine the number N of outputs of the control signal that corresponds to the AC voltage Vac obtained by the measuring circuit by referencing the correspondence relationship stored in the memory 22.

(Item 6) Operational History

The memory 22 and the operational history recording unit 1204 function as a holding circuit that holds the operational history (e.g., the cumulative energization time of the image forming apparatus 100) of the DC voltage source (e.g., the capacitor C20). The CPU 15 may control the number N of outputs of the control signal according to the operational history held in the holding circuit as a state parameter. As illustrated in FIG. 7, the capacitance of the capacitor C20 decreases according to the cumulative energization time. This means that the capability of the capacitor C20 to store charge, that is, the capability to generate the gate trigger current, deteriorates over time. Therefore, by determining the number N of outputs considering the operational history of the DC voltage source, it is possible to make the bidirectional thyristor 202 stably conduct.

(Item 7) Operational History

The memory 22 and the table 800 may function as a memory that stores in advance a correspondence relationship between the operational history of the DC voltage source and the number N of outputs of the control signal. The CPU 15 may determine the number N of outputs of the control signal that corresponds to the operational history of the DC voltage source by referencing the correspondence relationship stored in the memory 22. With this, it is possible to make the bidirectional thyristor 202 stably conduct.

(Item 8) Temperature+AC Voltage

The CPU 15 and the temperature sensing unit 1203 function as as an obtaining circuit for obtaining the measured value or the estimated value of the temperature Tj of the bidirectional thyristor 202. As described in the third embodiment, the CPU 15 may control the number N of outputs of the control signal using the measured value or the estimated value of the temperature Tj of the bidirectional thyristor 202 and the AC voltage Vac as state parameters.

(Item 9) Temperature+AC Voltage

The memory 22 and the table 1100 function as a memory that stores in advance a correspondence relationship between the number N of outputs of the control signal and a combination of the temperature Tj of the bidirectional thyristor 202 and the AC voltage Vac. The CPU 15 may determine the number N of outputs of the control signal that corresponds to the combination of the temperature Tj of the bidirectional thyristor 202 and the AC voltage Vac by referencing the correspondence relationship stored in the memory 22.

(Item 10) Temperature+Operational History

A configuration may be taken so as to use the measured value or the estimated value of the temperature of the bidirectional thyristor and the operational history as state parameters and control the number of outputs of the control signal.

(Item 11) Temperature+Operational History

The memory 22 and the table 800 function as a memory that stores in advance a correspondence relationship between the number N of outputs of the control signal and a combination of the temperature Tj of the bidirectional thyristor 202 and the operational history. The CPU 15 may determine the number N of outputs of the control signal that corresponds to the combination of the temperature Tj of the bidirectional thyristor 202 and the operational history by referencing the correspondence relationship stored in the memory 22.

(Item 12) AC Voltage+Operational History

As described in the fourth embodiment, the CPU 15 may control the number N of outputs of the control signal using the AC voltage Vac and the operational history as state parameters.

(Item 13) AC Voltage+Operational History

As described in the fourth embodiment, the memory 22 may function as a memory that stores in advance a correspondence relationship between the number N of outputs of the control signal and a combination of the AC voltage Vac and the operational history. The CPU 15 may determine the number N of outputs of the control signal that corresponds to the combination of the AC voltage Vac and the operational history by referencing the correspondence relationship stored in the memory 22.

(Item 14) Temperature+AC Voltage+Operational History

As described in the fourth embodiment, the CPU 15 may control the number N of outputs of the control signal using the temperature Tj of the bidirectional thyristor 202, the AC voltage Vac (e.g., the maximum value), and the operational history as state parameters.

(Item 15) Temperature+AC Voltage+Operational History

As described in the fourth embodiment, the memory 22 may function as a memory that stores in advance a correspondence relationship between the number N of outputs and a combination of the temperature Tj of the bidirectional thyristor 202, the AC voltage Vac, and the operational history. The CPU 15 may determine the number N of outputs that corresponds to the combination of the temperature Tj of the bidirectional thyristor 202, the AC voltage Vac, and the operational history by referencing the correspondence relationship stored in the memory 22.

(Item 16) Circuit Configuration

The capacitor C20, the bidirectional thyristor 202, a discharge resistor (e.g., R9), a switching element (e.g., the transistor Tr5), form the current loop LP2. The current loop LP2 functions as a discharging path for the capacitor C20. The diode D22, in the first half cycle of the AC voltage, causes the AC current from the AC power source to flow so as to charge the capacitor C20 and, in the second half cycle of the AC voltage, blocks the AC current so as to stop charging of the capacitor C20. In the second half cycle, the capacitor C20 performs discharge along the discharging path. With this, the DC voltage source generates the control signal (e.g., the gate trigger current that depends on the FSRD signal).

(Item 17)

The CPU 15 may recognize a boundary (zero cross) between two successive half cycles based on a sensing signal outputted from the zero cross sensing circuit 220.

(Item 18)

As described above, the operational history may include information related to the energization time of the image forming apparatus 100 (e.g., any of the cumulative energization time and the cumulative operating time of the image forming apparatus 100, the cumulative driving time of the motor 21, the cumulative energization time of the capacitor C20, and the like).

(Item 19)

The number of printed sheets of the image forming apparatus 100 may also be useful in estimating the cumulative energization time of the capacitor C20.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), or the like) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-000308, filed Jan. 4, 2024 which is hereby incorporated by reference herein in its entirety.

What is claimed is:

1. An image forming apparatus comprising:

a heating member configured to apply heat to a toner image formed on a sheet and fix the toner image to the sheet;

a bidirectional thyristor configured to control whether to supply power from an alternating current (AC) power source to the heating member;

a direct current (DC) voltage source configured to supply a control signal to a gate terminal of the bidirectional thyristor;

an obtaining circuit configured to obtain a measured value or an estimated value of a temperature of the bidirectional thyristor; and a controller configured to control, according to the measured value or the estimated value of the temperature of the bidirectional thyristor obtained by the obtaining circuit, a number of outputs of the control signal outputted from the DC voltage source to the gate terminal in a half cycle of the AC voltage.

2. The image forming apparatus according to claim 1, further comprising:

a memory configured to store in advance a correspondence relationship between the measured value or the estimated value of the temperature of the bidirectional thyristor and the number of outputs of the control signal, wherein the controller determines the number of outputs of the control signal corresponding to the obtained measured value or estimated value of the temperature of the bidirectional thyristor by referencing the correspondence relationship stored in the memory.

3. The image forming apparatus according to claim 1, wherein the obtaining circuit includes a measuring circuit configured to measure the AC voltage supplied from the AC power source, and the controller controls the number of outputs of the control signal further based on the AC voltage measured by the measuring circuit.

4. The image forming apparatus according to claim 3, further comprising:

a memory configured to store in advance a correspondence relationship between the AC voltage and the number of outputs of the control signal, wherein the controller determines the number of outputs of the control signal further based on the AC voltage obtained by the measuring circuit by referencing the correspondence relationship stored in the memory.

5. The image forming apparatus according to claim 1, wherein the obtaining circuit includes a first memory, which stores the operational history of the DC voltage source, and the controller controls the number of outputs of the control signal further based on the operational history held in the first memory.

6. The image forming apparatus according to claim 5, further comprising:

a second memory configured to store in advance a correspondence relationship between the operational history of the DC voltage source and the number of outputs of the control signal, wherein the controller determines the number of outputs of the control signal further based on the operational history of the DC voltage source held in the first memory by referencing the correspondence relationship stored in the second memory.

7. The image forming apparatus according to claim 1, wherein the obtaining circuit includes a measuring circuit configured to measure the AC voltage supplied from the AC power source, and the controller controls the number of outputs of the control signal using the AC voltage measured by the measuring circuit and the measured value or the estimated value of the temperature of the bidirectional thyristor.

8. The image forming apparatus according to claim 7, further comprising:

a memory configured to store in advance a correspondence relationship between the number of outputs of the control signal and a combination of the AC voltage and the measured value or the estimated value of the temperature of the bidirectional thyristor, and wherein the controller determines the number of outputs of the control signal corresponding to the combination of the AC voltage measured by the measuring circuit and the measured value or the estimated value of the temperature of the bidirectional thyristor by referencing the correspondence relationship stored in the memory.

9. The image forming apparatus according to claim 1, wherein the obtaining circuit includes a first memory, which stores the operational history of the DC voltage source, and the controller controls the number of outputs of the control signal further using the operational history held in the first memory and the measured value or the estimated value of the temperature of the bidirectional thyristor.

10. The image forming apparatus according to claim 9, further comprising:

a second memory configured to store in advance a correspondence relationship between the number of outputs of the control signal and a combination of the operational history and the measured value or the estimated value of the temperature of the bidirectional thyristor, and wherein the controller determines the number of outputs of the control signal corresponding to the combination of the operational history held in the first memory and the measured value or the estimated value of the temperature of the bidirectional thyristor by referencing the correspondence relationship stored in the second memory.

11. The image forming apparatus according to claim 1, wherein the obtaining circuit includes:

a measuring circuit configured to measure the AC voltage supplied from the AC power source; and a first memory, which stores the operational history of the DC voltage source, and the controller controls the number of outputs of the control signal further based on the AC voltage obtained by the measuring circuit and the operational history held in the first memory.

12. The image forming apparatus according to claim 11, further comprising:

a second memory configured to store in advance a correspondence relationship between the number of outputs of the control signal and a combination of the AC voltage and the operational history, wherein the controller determines the number of outputs of the control signal corresponding to the combination of the AC voltage obtained by the measuring circuit and the operational history held in the first memory by referencing the correspondence relationship stored in the second memory.

13. The image forming apparatus according to claim 1, wherein the obtaining circuit includes:

a measuring circuit configured to measure the AC voltage supplied from the AC power source; and a first memory, which stores the operational history of the DC voltage source, and the controller controls the number of outputs of the control signal using the measured value or the estimated value of the temperature of the bidirectional thyristor, the AC voltage measured by the measuring circuit, and the operational history of the DC voltage source held in the first memory.

14. The image forming apparatus according to claim 13, further comprising:

a second memory configured to store in advance a correspondence relationship between the number of outputs of the control signal and a combination of the measured value or the estimated value of the temperature of the bidirectional thyristor, the AC voltage, and the operational history, wherein the controller determines the number of outputs of the control signal corresponding to the combination of the measured value or estimated value of the temperature of the bidirectional thyristor obtained by the obtaining circuit, the AC voltage measured by the measuring circuit, and the operational history held in the first memory by referencing the correspondence relationship stored in the second memory.

15. The image forming apparatus according to claim 1, wherein the DC voltage source includes:

a capacitor with one end connected to a first terminal of the AC power source and a T1 terminal of the bidirectional thyristor; and a rectifying element connected between the other end of the capacitor and a second terminal of the AC power source and configured to, in a first half cycle of the AC voltage, cause AC current from the AC power source to flow so as to charge the capacitor and, in a second half cycle of the AC voltage, block the AC current so as to stop charging of the capacitor, a discharging path of the capacitor is formed by the capacitor, the bidirectional thyristor, a discharge resistor with one end connected to the gate terminal of the bidirectional thyristor, and a switching element connected between the other end of the discharge resistor and the other end of the capacitor, and the controller generates the control signal for the DC voltage source by causing the capacitor to discharge along the discharging path by controlling the switching element in the second half cycle.

16. The image forming apparatus according to claim 15, further comprising:

a sensing circuit configured to sense a zero cross of the AC voltage, wherein the controller recognizes the first half cycle and the second half cycle based on the zero cross sensed by the sensing circuit.

17. The image forming apparatus according to claim 1, wherein the operational history includes information related to an energization time of the image forming apparatus.

18. The image forming apparatus according to claim 1, wherein the operational history includes information related to the number of printed sheets of the image forming apparatus.

* * * * *